United States Patent
Tertel et al.

(10) Patent No.: US 9,643,146 B2
(45) Date of Patent: May 9, 2017

(54) UNIT FOR PROCESSING A LIQUID/GAS PHASE MIXTURE, MERCAPTAN OXIDATION SYSTEM INCLUDING THE SAME, AND METHOD OF PROCESSING A LIQUID/GAS PHASE MIXTURE

(71) Applicant: UOP LLC, Des Plaines, IL (US)

(72) Inventors: Jonathan Andrew Tertel, Mt. Prospect, IL (US); Quan Yuan, Northbrook, IL (US); Stephen R. Addison, Wauconda, IL (US)

(73) Assignee: UOP LLC, Des Plaines, IL (US)

( * ) Notice: Subject to any disclaimer, the term of this patent is extended or adjusted under 35 U.S.C. 154(b) by 553 days.

(21) Appl. No.: 14/093,155

(22) Filed: Nov. 29, 2013

(65) Prior Publication Data
US 2015/0151263 A1    Jun. 4, 2015

(51) Int. Cl.
*C10G 19/02* (2006.01)
*B01J 4/00* (2006.01)
*B01J 10/00* (2006.01)

(52) U.S. Cl.
CPC ............. *B01J 10/002* (2013.01); *B01J 4/004* (2013.01); *B01J 4/008* (2013.01); *C10G 19/02* (2013.01); *C10G 2300/202* (2013.01)

(58) Field of Classification Search
CPC ........... B01J 4/004; B01J 4/008; B01J 10/002
USPC ................... 422/606, 607, 220, 231
See application file for complete search history.

(56) References Cited

U.S. PATENT DOCUMENTS

| | | | |
|---|---|---|---|
| 1,157,993 A | * | 10/1915 | McElroy ............... B01J 23/755 422/226 |
| 2,413,945 A | | 1/1947 | Bolt |
| 2,591,946 A | | 4/1952 | Krause et al. |
| 2,646,389 A | | 7/1953 | Weisemann |
| 2,893,951 A | | 7/1959 | Pieters et al. |
| 2,921,021 A | | 1/1960 | Urban et al. |
| 2,966,453 A | | 12/1960 | Gleim et al. |
| 3,929,421 A | * | 12/1975 | Werges ...................... B01J 8/02 261/94 |
| 4,090,954 A | | 5/1978 | Ward |
| 4,098,681 A | | 7/1978 | Carlson |
| 4,104,155 A | | 8/1978 | Christman |
| 4,562,300 A | | 12/1985 | LaFoy |

(Continued)

OTHER PUBLICATIONS

Search Report dated Feb. 25, 2015 for corresponding PCT Appl. No. PCT/US2014/065598.

(Continued)

*Primary Examiner* — Lessanework Seifu

(57) ABSTRACT

A unit for processing a liquid/gas phase mixture, a mercaptan oxidation apparatus, and a method of processing a liquid/gas phase mixture are provided. In an embodiment, a unit for processing a liquid/gas phase mixture includes a vessel that is adapted to receive the liquid/gas phase mixture and a distributor that is disposed in the vessel. The distributor is adapted for flow of the liquid/gas phase mixture into the vessel, and the distributor includes a first outlet pipe that is horizontally disposed within the vessel. The first outlet pipe includes top orifices and bottom orifices that are spaced along the first outlet pipe, and the first outlet pipe is in fluid communication with the vessel through the top orifices and the bottom orifices. The top orifices have a smaller cross-sectional area than the bottom orifices.

13 Claims, 3 Drawing Sheets

(56) References Cited

U.S. PATENT DOCUMENTS

| | | | |
|---|---|---|---|
| 4,936,878 A | 6/1990 | Gustavsson et al. | |
| 5,032,325 A * | 7/1991 | Tharp | B01F 3/04262 |
| | | | 261/124 |
| 5,747,331 A | 5/1998 | Hartikainen et al. | |
| 6,659,434 B1 * | 12/2003 | Casas | B01D 47/16 |
| | | | 261/121.1 |
| 7,223,332 B1 | 5/2007 | Tertel | |
| 7,326,333 B2 * | 2/2008 | Laricchia | B01D 11/043 |
| | | | 208/226 |
| 2010/0248344 A1 | 9/2010 | Schroder et al. | |
| 2010/0294386 A1 | 11/2010 | Brogaard et al. | |
| 2011/0083592 A1 | 4/2011 | McDonald et al. | |
| 2011/0163008 A1 | 7/2011 | Zhang et al. | |
| 2012/0000827 A1 | 1/2012 | Krupa et al. | |
| 2014/0191424 A1 * | 7/2014 | Cai | B01F 3/04248 |
| | | | 261/124 |

OTHER PUBLICATIONS

Exxon Co. USA, et al., "Motionless Mixers Move to New Processing Roles," Chemical Engineering (N Y), v 84, n. 10, p. 95-96, May 9, 1977, ISSN: 00092460.

* cited by examiner

UNIT FOR PROCESSING A LIQUID/GAS PHASE MIXTURE, MERCAPTAN OXIDATION SYSTEM INCLUDING THE SAME, AND METHOD OF PROCESSING A LIQUID/GAS PHASE MIXTURE

TECHNICAL FIELD

The technical field generally relates to a unit for processing a liquid/gas phase mixture, a mercaptan oxidation system including the unit, and a method of processing a liquid/gas phase mixture in the unit. More particularly, the technical field relates to a unit for processing a liquid/gas phase mixture, a mercaptan oxidation system, and a method of processing a liquid/gas phase mixture with maximized homogeneity of the distribution of the liquid/gas phase mixture in a vessel of the unit.

BACKGROUND

Packed bed reaction vessels are widely used in unit operations where a controlled residence time and thorough mixing is desired for reactants. Certain packed bed reaction vessels are adapted to support reactions between liquid phase and gas phase reactants. For example, an oxidizer is generally employed in an LPG Merox unit to oxidize a sulfur-containing component that is separated from a hydrocarbon stream. "Merox" is an acronym for mercaptan oxidation. It is a proprietary catalytic chemical process developed by UOP LLC used in oil refineries and natural gas processing plants to remove mercaptan from liquefied petroleum gas (LPG), propane, butanes, light naphthas, by converting them to liquid hydrocarbon disulfides. More specifically, in a mercaptan extraction unit, a caustic stream is mixed with the hydrocarbon stream that includes mercaptan, and the mercaptan extraction unit produces a mercaptan-depleted stream and a first stream that includes a sulfur-containing component. The sulfur-containing component generally includes mercaptide, which is a reaction product of the caustic stream and the mercaptan from the hydrocarbon stream. The first stream is mixed with an appropriate catalyst and air to facilitate oxidation of the sulfur-containing component into disulfides, and the mixture of the first stream, catalyst, and air is introduced into the oxidizer to oxidize the mercaptide into disulfide.

Various reactant input and mixing configurations are employed in packed bed reaction vessels to maximize mixing of the liquid phase and gas phase reactants. For example, it is generally known to configure liquid phase inputs and gas phase inputs into the packed bed reaction vessels to maximize homogeneity of the distribution of the respective phases. It also known to mix the liquid phase and the gas phase, followed by introducing the mixture into the pack bed reaction vessel. However, it is difficult to achieve homogenous distribution of the liquid and gas phases into the packed bed reaction vessel when the respective phases are combined prior to introducing the mixture into the packed bed reaction vessel. Existing distributors generally include a horizontally-disposed pipe with holes spaces along a top thereof. However, with such configuration of the holes, an upstream portion of the distributor generally discharges mainly the gas phase, while a downstream portion of the distributor generally discharges the liquid phase. As a result, the liquid and gas phases are not adequately mixed upon introducing into the packed bed reaction vessel.

Accordingly, it is desirable to provide a unit for processing a liquid/gas phase mixture that can maximize homogeneity of the distribution of the liquid/gas phase mixture within a vessel. Further, it is desirable to provide a mercaptan oxidation system that includes an oxidizer with a distributor disposed there that can maximize the homogeneity of the distribution of a liquid/gas phase mixture within the oxidizer. Further still, it is desirable to provide a method of processing a liquid/gas phase mixture in a vessel where the homogeneity of the distribution of the liquid/gas phase mixture in the vessel is maximized. Furthermore, other desirable features and characteristics of the present invention will become apparent from the subsequent detailed description of the invention and the appended claims, taken in conjunction with the accompanying drawings and this background of the invention.

BRIEF SUMMARY

A unit for processing a liquid/gas phase mixture, a mercaptan oxidation apparatus, and a method of processing a liquid/gas phase mixture are provided herein. In an embodiment, a unit for processing a liquid/gas phase mixture includes a vessel that is adapted to receive the liquid/gas phase mixture and a distributor that is disposed in the vessel. The distributor is adapted for flow of the liquid/gas phase mixture into the vessel, and the distributor includes a first outlet pipe that is horizontally disposed within the vessel. The first outlet pipe includes top orifices and bottom orifices that are spaced along the first outlet pipe, and the first outlet pipe is in fluid communication with the vessel through the top orifices and the bottom orifices. The top orifices have a smaller cross-sectional area than the bottom orifices.

In another embodiment, a mercaptan oxidation apparatus includes a mercaptan extraction unit that is adapted to receive a hydrocarbon stream that includes mercaptan and a caustic stream. The mercaptan extraction unit is further adapted to mix the caustic stream and the hydrocarbon stream, and produces a mercaptan-depleted stream and a first stream that includes a sulfur-containing component. The mercaptan oxidation apparatus further includes an oxidizer that is in fluid communication with the mercaptan extraction unit and is configured to receive packing material in the oxidizer. The oxidizer is adapted to receive a liquid/gas phase mixture that includes air in the gas phase and the first stream in the liquid phase. A distributor is disposed in the oxidizer, and the distributor is adapted for flow of the liquid/gas phase mixture into the oxidizer. The distributor includes a first outlet pipe that is horizontally disposed within the oxidizer. The first outlet pipe includes top orifices and bottom orifices that are spaced along the first outlet pipe, and the first outlet pipe is in fluid communication with the oxidizer through the top orifices and the bottom orifices. The top orifices have a smaller cross-sectional area than the bottom orifices.

In another embodiment, a method of processing a liquid/gas phase mixture includes providing a vessel that is adapted to receive a liquid/gas phase mixture. A distributor is provided and disposed in the vessel. The distributor includes a first outlet pipe that is horizontally disposed within the vessel. The first outlet pipe includes top orifices and bottom orifices that are spaced along the first outlet pipe, and the first outlet pipe is in fluid communication with the vessel through the top orifices and the bottom orifices. The top orifices have a smaller cross-sectional area than the bottom orifices. A first stream in a liquid phase and a second stream in a gas phase are combined upstream of the distributor to form the liquid/gas phase mixture. The liquid/gas phase mixture is introduced into the vessel through the distributor.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
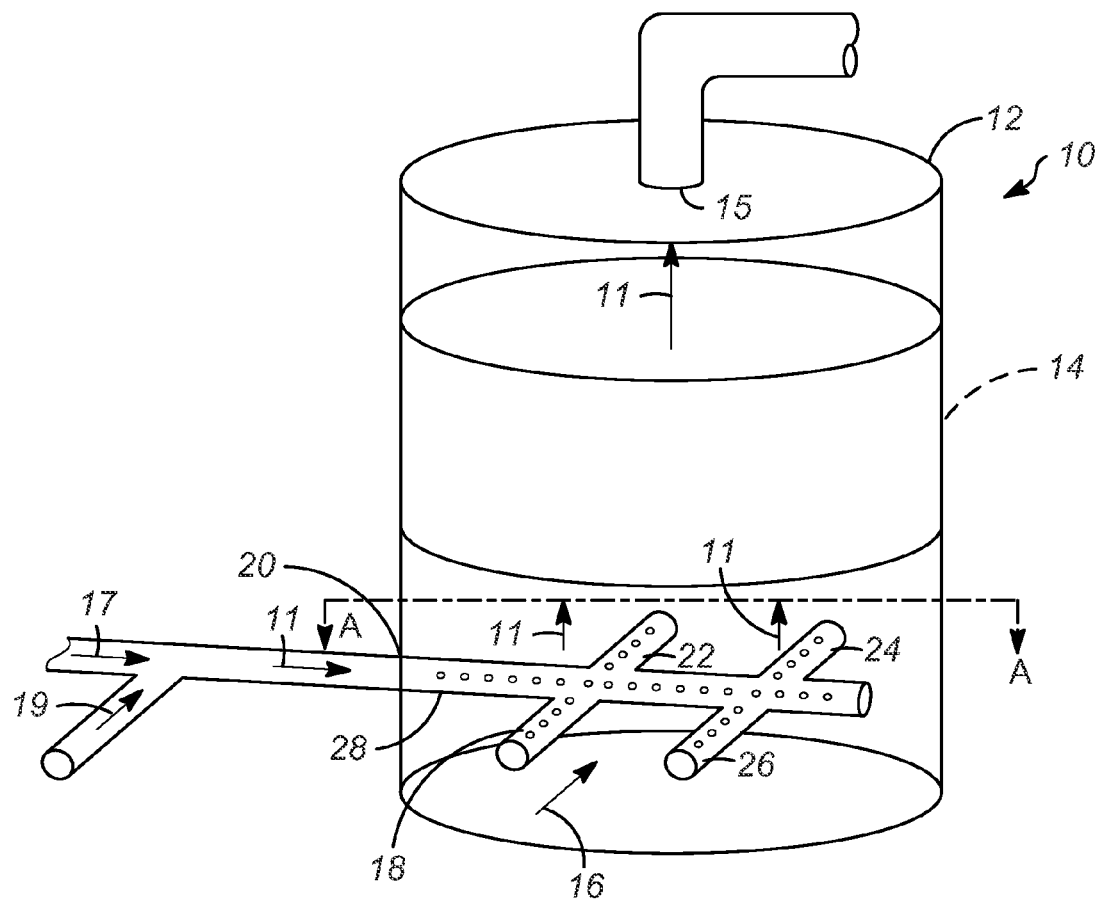
FIG. 1 is a perspective view of a unit for processing a liquid/gas phase mixture including a vessel and a distributor disposed in the vessel in accordance with an exemplary embodiment.

The following detailed description is merely exemplary in nature and is not intended to limit the various embodiments or the application and uses thereof. Furthermore, there is no intention to be bound by any theory presented in the preceding background or the following detailed description.

A unit for processing a liquid/gas phase mixture, a mercaptan oxidation system including the unit, and a method of processing a liquid/gas phase mixture in the unit are provided herein. As referred to herein, the liquid/gas phase mixture refers to a mixture of a liquid phase component and a gas phase component that are combined in a supply pipe and that is at least partially stratified, with at least some of the liquid phase and at least some of the gas phase remaining as distinct phases in the mixture. As also referred to herein, the unit for processing the liquid/gas phase mixture is a device that is adapted to receive the liquid/gas phase mixture and retain the liquid/gas phase mixture during a reaction therebetween, such as a packed bed reaction vessel and peripheral structures that support flow of the liquid/gas phase mixture into the vessel. In this regard, the unit includes a vessel that is adapted to receive the liquid/gas phase mixture and a distributor that is disposed in the vessel for supporting flow of the liquid/gas phase mixture into the vessel. The distributor includes a first outlet pipe into the vessel, with the first outlet pipe horizontally disposed within the vessel. As referred to herein, "horizontally disposed" refers to a positioning of the first outlet pipe with a lateral component to a direction of flow of the liquid/gas phase mixture within the first outlet pipe, with the first outlet pipe generally perpendicular in relation to the pull of gravity. The first outlet pipe includes top orifices and bottom orifices spaced along the first outlet pipe, with the first outlet pipe in fluid communication with the vessel through the top orifices and the bottom orifices. Given the horizontal disposition of the first outlet pipe, the gas phase of the liquid/gas phase mixture generally flows through the top orifices and the liquid phase of the liquid/gas phase mixture generally flows through the bottom orifices. To maximize homogeneity of the distribution of the liquid/gas phase mixture within the vessel, the top orifices have a smaller cross-sectional area than the bottom orifices, which enables balancing of flow of the gas phase and the liquid phase through the respective orifices. In particular, the liquid/gas phase mixture exhibits at least some stratification within the first outlet pipe, with the gas phase localized adjacent to the top orifices and the liquid phase localized adjacent to the bottom orifices. Under pressure, the gas phase generally flows out of the top orifices at a greater fluid velocity than fluid velocity of the liquid phase out of the bottom orifices. The orifice cross-sectional areas are configured such that the difference between pressure drops across the top orifices and the bottom orifices are balanced with hydrostatic pressure variation for orifices at different elevations. The differences in relative cross-sectional areas of the top orifices and the bottom orifices enables balancing of fluid flow through the respective orifices given the differences in fluid velocity and density between the gas phase and the liquid phase. In this regard, unbalanced fluid flow through the respective orifices can be avoided, thereby enabling even distribution of the liquid/gas phase mixture along a length of the first outlet pipe and even at an end thereof.

An embodiment of a unit for processing a liquid/gas phase mixture will now be described with reference to FIGS. 1 and 2. Referring to FIG. 1, the unit 10 includes a vessel 12 that is adapted to receive a liquid/gas phase mixture 11. The vessel 12 is not limited and can be any container that is capable of receiving the liquid/gas phase mixture 11 and supporting reaction within the liquid/gas phase mixture 11. In embodiments, the vessel 12 is adapted to receive a packing material 14 therein, and the vessel 12 may be referred to as a fixed bed vessel. The packing material 14 may be any conventional type of packing material employed in fixed beds, such as random packing, and serves to increase surface area for maximizing contact between the liquid phase and the gas phase in the vessel 12. Other types of suitable packing material 14 can include structured packing, fiber and/or film contactors, tray systems (e.g., one or more trays), or the like. The vessel 12 includes an outlet 15 for conveying the liquid/gas phase mixture 11 out of the vessel 12 after a designated residence period within the vessel 12.

A distributor 16 is disposed in the vessel 12, and the distributor 16 is adapted to for flow of the liquid/gas phase mixture 11 into the vessel 12. The distributor 16 includes a first outlet pipe 18 that is horizontally disposed within the vessel 12. In an embodiment and as shown in FIGS. 1 and 2, the distributor 16 further includes a header 20 and an additional outlet pipe 22, although it is to be appreciated that the distributor 16 may include more than one additional outlet pipes 22, 24, and/or 26 depending upon the size of the vessel 12 and design considerations to achieve homogenous distribution of the liquid/gas phase mixture 11 through a cross section of the vessel 12. The header 20, as referred to herein, is an intermediate pipe that extends into the vessel 12 and is in fluid communication with the first outlet pipe 18 for conveying the liquid/gas phase mixture 11 to the first outlet pipe 18. In particular, the header 20 is disposed between an inlet 28 of the distributor 16 into the vessel 12 and the outlet pipes 18, 22, 24, 26 and supplies the outlet pipes 18, 22, 24, 26 with the liquid/gas phase mixture 11. The additional outlet pipe 22 is in fluid communication with the header 20 separate from the first outlet pipe 18.

Figure 2:
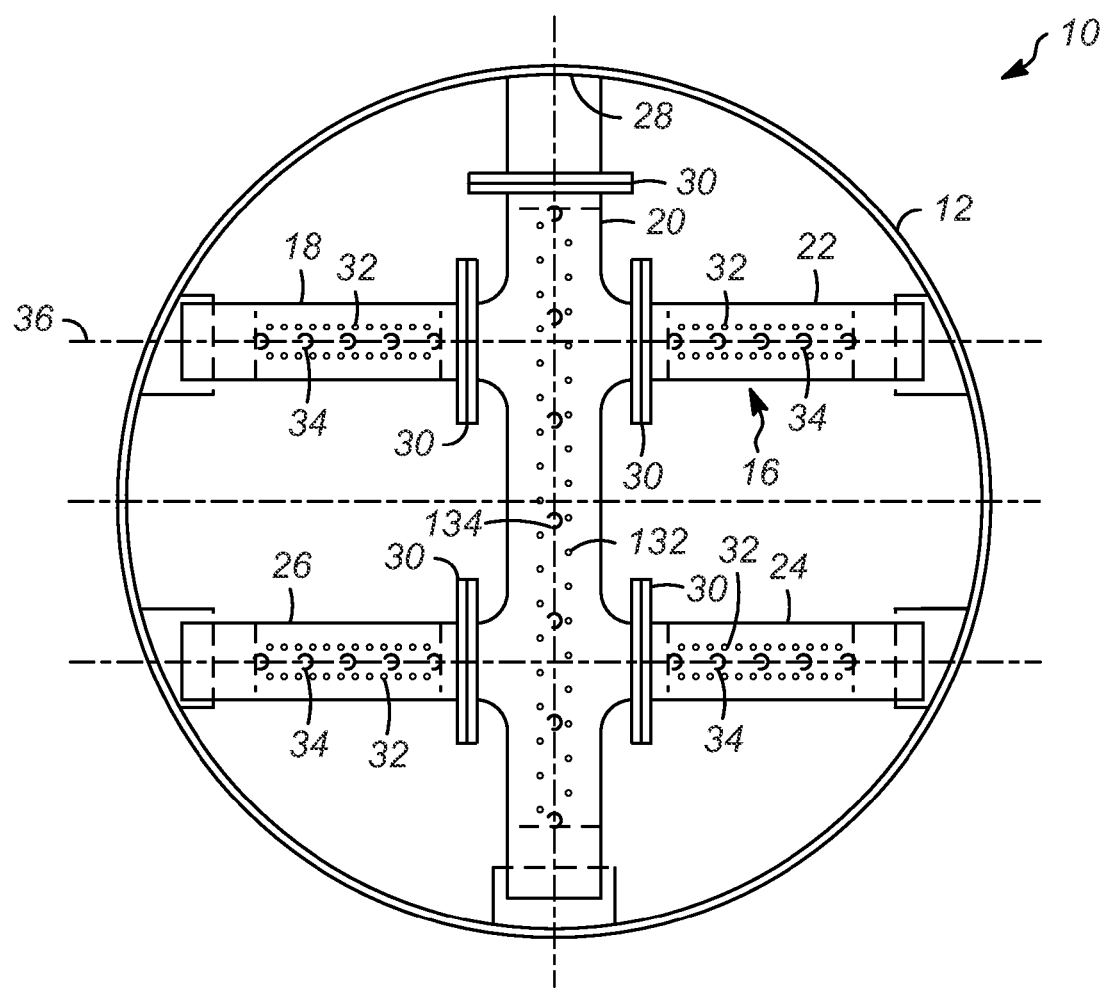
FIG. 2 is a cross-sectional top view of the unit of FIG. 1 along line A-A.

In an embodiment and as shown in FIGS. 1 and 2, the first outlet pipe 18 is configured to laterally extend across a cross section of the vessel 12, with the first outlet pipe 18 and the additional outlet pipes 22, 24, 26 disposed transverse to the header 20. However, specific configurations of the header 20 and outlet pipes 18, 22, 24, 26 are not limited and may be arranged in various geometries to provide the liquid/gas phase mixture 11 generally across the cross section of the vessel 12. In embodiments and as shown in FIG. 2, the first outlet pipe 18 and the additional outlet pipes 22, 24, 26 are removably connected to the header 20 through a pipe coupler 30 to enable installation of the outlet pipes 18, 22,

24, 26. Further, the header 20 may be removably connected to the inlet 28 of the distributor 16 through a pipe coupler 30.

Referring to FIG. 2, the first outlet pipe 18 includes top orifices 32 and bottom orifices 34. The top orifices 32 and the bottom orifices 34 are spaced along the first outlet pipe 18, with the first outlet pipe 18 in fluid communication with the vessel 12 through the top orifices 32 and the bottom orifices 34. With the first outlet pipe 18 horizontally disposed, the top orifices 32 are located on a top half of the first outlet pipe 18 as taken with a perspective along a horizontal plane that passes through a center of the first outlet pipe 18. Stated differently, the top orifices 32 are located on a radius that extends +/−90 degrees from a vertical plane 36 through the center of the first outlet pipe 18. Conversely, the bottom orifices 34 are located on the bottom half of the first outlet pipe 18.

The top orifices 32 and the bottom orifices 34 are configured to balance flow of the gas phase of the liquid/gas phase mixture through the top orifices 32 and the liquid phase of the liquid/gas phase mixture through the bottom orifices 34. In embodiments, the top orifices 32 and the bottom orifices 34 are configured to balance a pressure differential across the respective orifices to a ΔP up to 10 KPa corresponding to the hydrostatic pressure differential between orifices 32 and 34, which enables substantially even flow of the gas phase through the top orifices 32 and the liquid phase through the bottom orifices 34 across a length of the first outlet pipe 18. To enable balancing of the flow of the liquid phase and the gas phase out of the respective orifices 32, 34, the top orifices 32 have a smaller cross-sectional area than the bottom orifices 34, which compensates for flow of the gas phase out of the top orifices 32 at a greater fluid velocity than fluid velocity of the liquid phase out of the bottom orifices 34. In embodiments, a ratio of cross-sectional areas of the bottom orifices 34 to the top orifices 32 is from about 5:1 to about 20:1. It is to be appreciated that spacing and actual size of the respective orifices 32, 34 is subject to design considerations and specific dimensions of the vessel 12 into which the liquid/gas phase mixture is introduced, as well as other process variables including flow rates of the liquid/gas phase mixture and relative amounts of the liquid phase and gas phase in the liquid/gas phase mixture.

In an embodiment and as shown in FIG. 2, to further promote mixing of the liquid phase and the gas phase within the vessel 12, the top orifices 32 are laterally offset from the vertical plane 36 that passes through the center of the first outlet pipe 18. In this regard, the gas phase is introduced into the vessel 12 with a lateral component to fluid flow of the gas phase, thereby maximizing mixing. For example, the top orifices 32 may be laterally offset at an angle of from greater than 0 to 30 degrees from the vertical plane 36, although the specific angle of offset could be dependent on relative levels of the liquid phase and the gas phase in the first outlet pipe 18 to ensure that the top orifices 32 are still located in the portion of the first outlet pipe 18 where the stratified gas phase flows. In embodiments, top orifices 32 are located on both sides of the vertical plane 36, e.g., rows of top orifices 32 may be provided with the rows disposed on either side of the vertical plane 36. In embodiments, the bottom orifices 34 are located on the vertical plane 36, although specific location of the bottom orifices 34 is not limited.

In embodiments and as shown in FIG. 2, the additional outlet pipe 22, 24, and/or 26 also includes top orifices 32 and bottom orifices 34 in the same or different configuration as the first outlet pipe 18. In embodiments and as also shown in FIG. 2, the header 20 further includes top orifices 132 and bottom orifices 134, with the top orifices 132 of the header 20 having a smaller cross-sectional area than the bottom orifices 134 of the header 20 similar to the relationship between the top orifices 32 and the bottom orifices 34 of the first outlet pipe 18 and the additional outlet pipe 22, 24, and/or 26. However, the top orifices 132 and/or the bottom orifices 134 of the header 20 may be spaced differently than the top orifices 32 and/or the bottom orifices 34 in the first outlet pipe 18 and/or the additional outlet pipe 22, 24, and/or 26 to avoid disproportional flow of the liquid/gas phase mixture out of the header 20. For example, the top orifices 132 and/or the bottom orifices 134 of the header 20 may be spaced with greater distances therebetween than the top orifices 32 and/or the bottom orifices 34 of the first outlet pipe 18 and/or the additional outlet pipe 22, 24, and/or 26.

In an exemplary method of processing a liquid/gas phase mixture and with reference to FIG. 1, a first stream 17 in a liquid phase and a second stream 19 in a gas phase are combined upstream of the distributor 16 to form the liquid/gas phase mixture. Although primarily including liquid phase components, it is to be appreciated that the first stream 17 may include gas and/or solids provided that the first stream includes liquids as a continuous phase. Likewise, the second stream 19, although primarily including gas phase components, may also include liquid or solid phase components. In embodiments, the liquid phase is the continuous phase in the liquid/gas phase mixture 11, with the gas phase being a discontinuous phase. However, as set forth above, the liquid/gas phase mixture is at least partially stratified, with at least some of the liquid phase and at least some of the gas phase remaining as distinct phases in the mixture during flow through the distributor 16. Further, it is to be appreciated that exchange of chemical species between the liquid phase and the gas phase generally occurs in the liquid/gas phase mixture. After mixing upstream of the distributor 16, the liquid/gas phase mixture is introduced into the vessel 12 through the distributor 16 and, more specifically, through the top orifices 32, 132 and bottom orifices 34, 134.

A mercaptan oxidation apparatus and a method of using the mercaptan oxidation apparatus will now be described with reference to FIG. 3. The mercaptan oxidation apparatus 38 may be employed to treat a hydrocarbon stream 42 that includes mercaptan by removing mercaptan and other sulfur-containing species from the hydrocarbon stream 42 to produce a mercaptan-depleted stream 46 that is ultimately employed, for example, as gasoline or LPG with overall reduction in total sulfur in the mercaptan-depleted stream 46. The mercaptan oxidation apparatus 38 may be configured in a conventional manner, with a mercaptan extraction unit 40 and the vessel 12, as described above, employed as an oxidizer 12 and in fluid communication with the mercaptan extraction unit 40.

The mercaptan extraction unit 40 is adapted to receive the hydrocarbon stream 42 and a caustic stream 44, and is further adapted to mix the caustic stream 44 and the hydrocarbon stream 42 to produce a mercaptan-depleted stream 46 and a first stream 17 that includes a sulfur-containing component. During operation, the caustic stream 44 is generally introduced into a top of the mercaptan extraction unit 40 and the hydrocarbon stream 42 is generally introduced into the mercaptan extraction unit 40 below the caustic stream 44, with the hydrocarbon stream 42 and the caustic stream 44 intermingled in a counter-current manner. Although not shown, the hydrocarbon stream 42 may be pre-treated to remove $H_2S$ species therefrom in a stand-alone unit, with mercaptan remaining in the hydrocarbon stream 42 for removal in the mercaptan extraction unit 40. Alternatively, the mercaptan extraction unit 40 may include a pre-wash zone (not shown) for removing the $H_2S$ species from the hydrocarbon stream 42. The caustic stream 44 may include any alkaline material, and generally includes an aqueous solution of caustic soda (i.e., sodium hydroxide). In the mercaptan extraction unit 40, the mercaptan is removed from the hydrocarbon stream 42 to produce the mercaptan-depleted stream 46 as a gas or liquid phase overhead stream, depending upon the hydrocarbon composition. More specifically, the alkaline material in the caustic stream 44 reacts with the mercaptan to produce mercaptide and water. The mercaptide and water, along with unused alkaline material from the caustic stream 44 and optionally other sulfur-containing compounds, is withdrawn from the mercaptan extraction unit 40 as the first stream 17 in liquid phase. The first stream includes the sulfur-containing component, which includes mercaptides and any other sulfur-containing compounds that may be present in the first stream 17.

Figure 3:
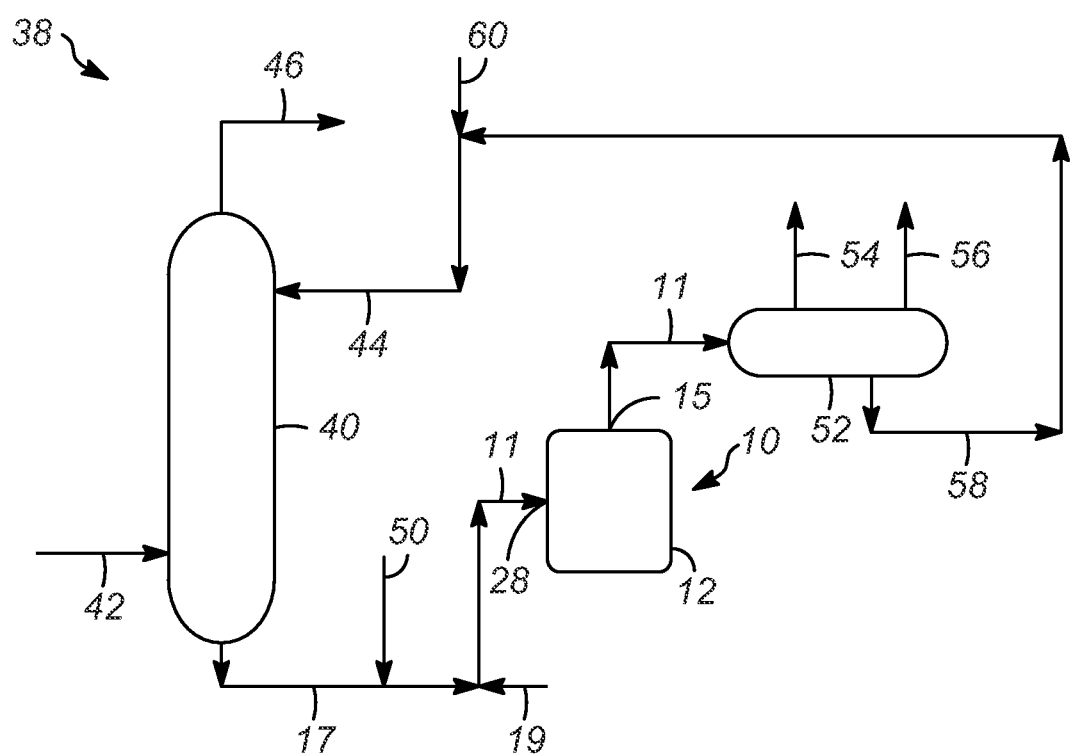
FIG. 3 is a schematic diagram of a mercaptan oxidation apparatus and a method of processing a liquid/gas phase mixture in accordance with another exemplary embodiment.

Referring to FIG. 3, a catalyst 50 may be mixed with the first stream 17 in anticipation of oxidizing the mercaptide in the first stream 17 into disulfide. The catalyst 50 may be an oxidation catalyst and any conventional oxidation catalyst may be employed. One example of a suitable oxidation catalyst is sulfonated metal phthalocyanine. After mixing the first stream 17 and the catalyst 50, the first stream 17 and a second stream 19 that includes air are combined to form a liquid/gas phase mixture 11. Within the liquid/gas phase mixture 11, oxygen in the air reacts with the mercaptide and water in the presence of the catalyst 50 to produce disulfide and regenerated alkaline material. The liquid/gas phase mixture 11 is introduced into the oxidizer 12, with the distributor disposed in the oxidizer as described above. The oxidizer 12 and the distributor maximize mixing and provide a controlled residence time for the reaction between the mercaptide, air, and water to occur. After a pre-determined residence time within the oxidizer 12, the liquid/gas phase mixture 11 is withdrawn from the oxidizer 12 and is separated in a separator 52 to recover the alkaline material 58, which is optionally mixed with fresh alkaline material 60 and recycled in the caustic stream 44 to the mercaptan extraction unit 40. Excess air 54 and separated disulfide 56 is removed from the separator 52 for remediation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A unit for processing a liquid/gas phase mixture, wherein the unit comprises:
   a vessel adapted to receive the liquid/gas phase mixture; and
   a distributor disposed in the vessel, wherein the distributor is adapted for flow of the liquid/gas phase mixture into the vessel, and wherein the distributor comprises a first outlet pipe horizontally disposed within the vessel, wherein the first outlet pipe comprises top orifices and bottom orifices spaced therealong with the first outlet pipe in fluid communication with the vessel through the top orifices and the bottom orifices, and wherein the top orifices have a smaller cross-sectional area than the bottom orifices and the top orifices and the bottom orifices are configured to balance a pressure differential across the respective orifices to a $\Delta P$ up to 10 KPa.

2. The unit of claim 1, wherein the distributor further comprises a header extending into the vessel and in fluid communication with the first outlet pipe for conveying the liquid/gas phase mixture to the first outlet pipe.

3. The unit of claim 2, wherein an additional outlet pipe is in fluid communication with the header separate from the first outlet pipe, wherein the additional outlet pipe also comprises top orifices and bottom orifices, and wherein the top orifices of the additional outlet pipe have a smaller cross-sectional area than the bottom orifices of additional outlet pipe.

4. The unit of claim 3, wherein more than one additional outlet pipe is in fluid communication with the header.

5. The unit of claim 2, wherein the header further comprises top orifices and bottom orifices, wherein the top orifices of the header have a smaller cross-sectional area than the bottom orifices of the header.

6. The unit of claim 5, wherein top orifices and/or the bottom orifices of the header are spaced differently than the top orifices and/or the bottom orifices in the additional outlet pipe or the first outlet pipe.

7. The unit of claim 2, wherein the first outlet pipe is configured to laterally extend across a cross section of the vessel, with the first outlet pipe disposed transverse to the header.

8. The unit of claim 1, wherein the first outlet pipe is removably connected to the header through a pipe coupler.

9. The unit of claim 1, wherein a ratio of cross-sectional areas of the bottom orifices to the top orifices is from about 5:1 to about 20:1.

10. The unit of claim 1, wherein the top orifices are laterally offset from a vertical plane passing through a center of the first outlet pipe.

11. The unit of claim 10, wherein the top orifices located on both sides of the vertical plane.

12. The unit of claim 1, wherein a packing material is disposed in the vessel, and wherein the vessel is a fixed bed vessel.

13. A mercaptan oxidation apparatus comprising:
   a mercaptan extraction unit adapted to receive a hydrocarbon stream comprising mercaptan and a caustic stream, and further adapted to mix the caustic stream and the hydrocarbon stream and produce a mercaptan-depleted stream and a first stream comprising a sulfur-containing component;
   an oxidizer in fluid communication with the mercaptan extraction unit and configured to receive packing material therein, wherein the oxidizer is adapted to receive a liquid/gas phase mixture comprising air in the gas phase and the first stream in the liquid phase; and
   a distributor disposed in the oxidizer, wherein the distributor is adapted for flow of the liquid/gas phase mixture into the oxidizer, and wherein the distributor comprises a first outlet pipe horizontally disposed within the oxidizer, wherein the first outlet pipe comprises top orifices and bottom orifices spaced therealong with the first outlet pipe in fluid communication with the oxidizer through the top orifices and the bottom orifices, and wherein the top orifices have a smaller cross-sectional area than the bottom orifices and the top orifices and the bottom orifices are configured to balance a pressure differential across the respective orifices to a $\Delta P$ up to 10 KPa.

\* \* \* \* \*